United States Patent
Theobald et al.

(10) Patent No.: US 11,475,608 B2
(45) Date of Patent: Oct. 18, 2022

(54) FACE IMAGE GENERATION WITH POSE AND EXPRESSION CONTROL

(71) Applicant: Apple Inc., Cupertino, CA (US)

(72) Inventors: Barry-John Theobald, San Jose, CA (US); Nataniel Ruiz Gutierrez, Boston, MA (US); Nicholas E. Apostoloff, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/983,561

(22) Filed: Aug. 3, 2020

(65) Prior Publication Data
US 2021/0097730 A1 Apr. 1, 2021

Related U.S. Application Data
(60) Provisional application No. 62/906,152, filed on Sep. 26, 2019.

(51) Int. Cl.
| | |
|---|---|
| *G06T 11/00* | (2006.01) |
| *G06N 20/00* | (2019.01) |
| *G06V 40/16* | (2022.01) |

(52) U.S. Cl.
CPC .............. *G06T 11/00* (2013.01); *G06N 20/00* (2019.01); *G06V 40/174* (2022.01)

(58) Field of Classification Search
None
See application file for complete search history.

(56) References Cited

U.S. PATENT DOCUMENTS

| | | | | |
|---|---|---|---|---|
| 5,745,668 A | * | 4/1998 | Poggio | ............... G06T 9/001 |
| | | | | 345/475 |
| 8,320,660 B2 | * | 11/2012 | Ishiyama | ............... G06T 17/10 |
| | | | | 382/154 |

(Continued)

FOREIGN PATENT DOCUMENTS

| | | |
|---|---|---|
| CN | 107392118 A | 11/2017 |
| CN | 107423701 A | 12/2017 |

(Continued)

OTHER PUBLICATIONS

Tianye Li, Timo Bolkart, Michael J. Black, Hao Li, Javier Romero, "Learning a Model of Facial Shape and Expressions from 4D Scans," 2017, ACM Transactions on Graphics, 36(6):Article:194, pp. 1-17, https://doi.org/10.1145/3130800.3130813 (Year: 2017).*

(Continued)

*Primary Examiner* — Michael J Cobb
(74) *Attorney, Agent, or Firm* — Young Basile Hanlon & MacFarlane, P.C.

(57) ABSTRACT

One aspect of the disclosure is a non-transitory computer-readable storage medium including program instructions. Operations performed by execution of the program instructions include obtaining an input image that depicts a face of a subject, having an initial facial expression and an initial pose, determining a reference shape description based on the input image, determining a target shape description based on the reference shape description, a facial expression difference, and a pose difference, generating a rendered target shape image using the target shape description, and generating an output image based on the input image and the rendered target shape using an image generator, wherein the output image is a simulated image of the subject of the input image that has a final expression that is based on the initial facial expression and the facial expression difference, and a (Continued)

final pose that is based on the initial pose and the pose difference.

24 Claims, 7 Drawing Sheets

(56) References Cited

U.S. PATENT DOCUMENTS

| | | | |
|---|---|---|---|
| 8,582,896 | B2 | 11/2013 | Ionita et al. |
| 9,104,908 | B1* | 8/2015 | Rogers ............... G06K 9/00315 |
| 9,818,024 | B2 | 11/2017 | Bacivarov et al. |
| 10,269,165 | B1* | 4/2019 | Bhat ....................... G06T 13/40 |
| 2006/0148323 | A1 | 7/2006 | Canzler et al. |
| 2009/0257625 | A1 | 10/2009 | Liu et al. |
| 2012/0062719 | A1 | 3/2012 | Debevec et al. |
| 2013/0127827 | A1 | 5/2013 | Shiell et al. |
| 2017/0053663 | A1* | 2/2017 | Yu ............................ G06T 7/246 |
| 2017/0061253 | A1* | 3/2017 | Burgos ....................... G06T 7/70 |
| 2019/0050632 | A1 | 2/2019 | Weng et al. |
| 2019/0051057 | A1 | 2/2019 | Sommerlade et al. |
| 2019/0080148 | A1 | 3/2019 | He et al. |
| 2019/0087648 | A1 | 3/2019 | Du |
| 2019/0147333 | A1 | 5/2019 | Kallur Palli Kumar et al. |
| 2019/0236759 | A1 | 8/2019 | Lai et al. |
| 2019/0244138 | A1 | 8/2019 | Bhowmick et al. |
| 2020/0051303 | A1* | 2/2020 | Li ............................ G06T 13/40 |
| 2020/0334867 | A1* | 10/2020 | Chen .................... G06K 9/6256 |
| 2021/0097730 | A1* | 4/2021 | Theobald ............. G06N 3/0472 |
| 2021/0104086 | A1* | 4/2021 | Wang ...................... G06N 3/084 |
| 2021/0335029 | A1* | 10/2021 | Kowalski ................ G06T 9/002 |
| 2021/0350621 | A1* | 11/2021 | Bailey .................... G06T 3/4046 |

FOREIGN PATENT DOCUMENTS

| | | | | |
|---|---|---|---|---|
| CN | 107437077 | A | 12/2017 | |
| CN | 107730458 | A | 2/2018 | |
| CN | 108182657 | A | 6/2018 | |
| CN | 108288072 | A | 7/2018 | |
| CN | 108319932 | A | 7/2018 | |
| CN | 108334816 | A | 7/2018 | |
| CN | 108510061 | A | 9/2018 | |
| CN | 108537743 | A | 9/2018 | |
| WO | WO-2006008485 | A1 * | 1/2006 | ............. G06T 11/00 |
| WO | 2019056000 | A1 | 3/2019 | |

OTHER PUBLICATIONS

Nataniel Ruiz, Barry-John Theobald, Anurag Ranjan, Ahmed Hussein Abdelaziz, Nicholas Apostoloff, "MorphGAN: One-Shot Face Synthesis GAN for Detecting Recognition Bias", 2020, retrieved from "https://arxiv.org/pdf/2012.05225.pdf" (Year: 2020).*
Apple, "MorphGAN: Controllable One-Shot Face Synthesis," 2021, Apple Machine Learning Research, retrieved from "https://machinelearning.apple.com/research/morphgan" (Year: 2021).*
Yuqian Zhou, Bertram Emil Shi, "Photorealistic Facial Expression Synthesis by the Conditional Difference Adversarial Autoencoder" , 2017, Seventh International Conference on Affective Computing and Intelligent Interaction (ACII), pp. 370-376, DOI: 10.1109/ACII.2017.8273626 (Year: 2017).*
Wang, X., et al., "A Survey On Face Data Augmentation", arXiv:1904.11685v1 [cs.CV] Apr. 26, 2019 (26 pp).
Tripathy, S., et al., "ICface: Interpretable and Controllable Face Reenactment Using GANs", arXiv:1904.01909v1 [cs.CV] Apr. 3, 2019 (10 pp).
Gu, S., et al., "Mask-Guided Portrait Editing With Conditional GANs", arXiv:1905.10346v1 [cs.CV] May 24, 2019 (10 pp).
Chen, X., et al., "FTGAN: A Fully-trained Generative Adversarial Networks for Text to Face Generation", arXiv:1904.05729v1 [cs.CV] Apr. 11, 2019 (10 pp).
Hukkelås, H., et al., "Deep Privacy: A Generative Adversarial Network for Face Anonymization", arXiv:1909.04538v1 [cs.CV] Sep. 10, 2019 (14 pp).
Duarte, A., "WAV2PIX: Speech-Conditioned Face Generation Using Generative Adversarial Networks", arXiv:1903.10195v1 [cs.MM] Mar. 25, 2019 (5 pp).
Otberdout, N., et al., "Dynamic Facial Expression Generation on Hilbert Hypersphere With Conditional Wasserstein Generative Adversarial Nets", arXiv:1907.10087v1 [cs.CV] Jul. 23, 2019 (15 pp).
Pumarola, A., et al., "GANimation: Anatomically-aware Facial Animation from a Single Image", https://arxiv.org/abs/1807.09251 Jul. 24, 2018 (16 pp).
Pieters, M., et al., "Comparing Generative Adversarial Network Techniques for Image Creation and Modification", arXiv:1803.09093v1 [cs.LG] Mar. 24, 2018 (20 pp).
Wang, T., et al., "CycleGAN With Better Cycles", https://ssnl.github.io/better_cycles/report.pdf, Date Unknown, Downloaded Sep. 19, 2019 (8 pp).
Almahairi, A., et al., "Augmented CycleGAN: Learning Many-to-Many Mappings from Unpaired Data", arXiv:1802.10151v2 [cs.LG] Jun. 18, 2018 (10 pp).
Korshunov, P., et al., "DeepFakes: a New Threat to Face Recognition? Assessment and Detection", arXiv:1812.08685v1 [cs.CV] Dec. 20, 2018 (5 pp).
Wang, T., et al., "pix2pixHD: High-Resolution Image Synthesis and Semantic Manipulation With Conditional GANs", https://arxiv.org/abs/1711.11585 Nov. 30, 2017 (58 pp).
Cootes, T., et al., "Active Appearance Models", IEEE Transactions on Pattern Analysis and Machine Intelligence, vol. 23, No. 6, Jun. 2001 (5 pp).
Ji, D., et al., "Deep View Morphing", https://arxiv.org/abs/1703.02168 Mar. 7, 2017 (28 pp).
Cootes, T.F., et al., "Active Appearance Models", https://www.cs.cmu.edu/~efros/courses/LBMV07/Papers/cootes-eccv-98.pdf. Proc. European Conf on Computer Vision 1998, vol. 2, pp. 484-498, Springer 1998 (16 pp).
Wiles, O., et al., "X2Face: A network for controlling face generation using images, audio, and pose codes", https://arxiv.org/abs/1807.10550 Jul. 27, 2018 (24 pp).

* cited by examiner

FACE IMAGE GENERATION WITH POSE AND EXPRESSION CONTROL

CROSS-REFERENCE TO RELATED APPLICATIONS

This application claims the benefit of U.S. Provisional Application No. 62/906,152, filed on Sep. 26, 2019, the content of which is hereby incorporated by reference herein for all purposes.

TECHNICAL FIELD

This disclosure relates to systems that generate simulated images of human faces.

BACKGROUND

Machine learning techniques have been applied to generate synthetic still images and video sequences. These synthetic still images and video sequences may be photorealistic representations of real people, places, or things, but are not real images.

SUMMARY

One aspect of the disclosure is a non-transitory computer-readable storage medium including program instructions that are executable by one or more processors that, when executed, cause the one or more processors to perform operations. The operations include obtaining an input image that depicts a face of a subject, wherein the face of the subject has an initial facial expression and an initial pose, determining a reference shape description based on the input image, determining a target shape description based on the reference shape description, a facial expression difference, and a pose difference, generating a rendered target shape image using the target shape description, and generating an output image based on the input image and the rendered target shape using an image generator, wherein the output image is a simulated image of the subject of the input image that has a final expression that is based on the initial facial expression and the facial expression difference, and a final pose that is based on the initial pose and the pose difference.

Another aspect of the disclosure is a system that includes a memory and a processor. The memory includes program instructions. The processor is operable to execute the program instructions. The program instructions, when executed by the processor, cause the processor to obtain an input image that depicts a face of a subject, wherein the face of the subject has an initial facial expression and an initial pose, determine a reference shape description based on the input image, determine a target shape description based on the reference shape description, a facial expression difference, and a pose difference, generate a rendered target shape image using the target shape description, and generate an output image based on the input image and the rendered target shape using an image generator, wherein the output image is a simulated image of the subject of the input image that has a final expression that is based on the initial facial expression and the facial expression difference, and a final pose that is based on the initial pose and the pose difference.

Another aspect of the disclosure is a method that includes obtaining an input image that depicts a face of a subject, wherein the face of the subject has an initial facial expression and an initial pose, determining a reference shape description based on the input image, determining a target shape description based on the reference shape description, a facial expression difference, and a pose difference, generating a rendered target shape image using the target shape description, and generating an output image based on the input image and the rendered target shape using an image generator, wherein the output image is a simulated image of the subject of the input image that has a final expression that is based on the initial facial expression and the facial expression difference, and a final pose that is based on the initial pose and the pose difference.

DETAILED DESCRIPTION

Figure 1:
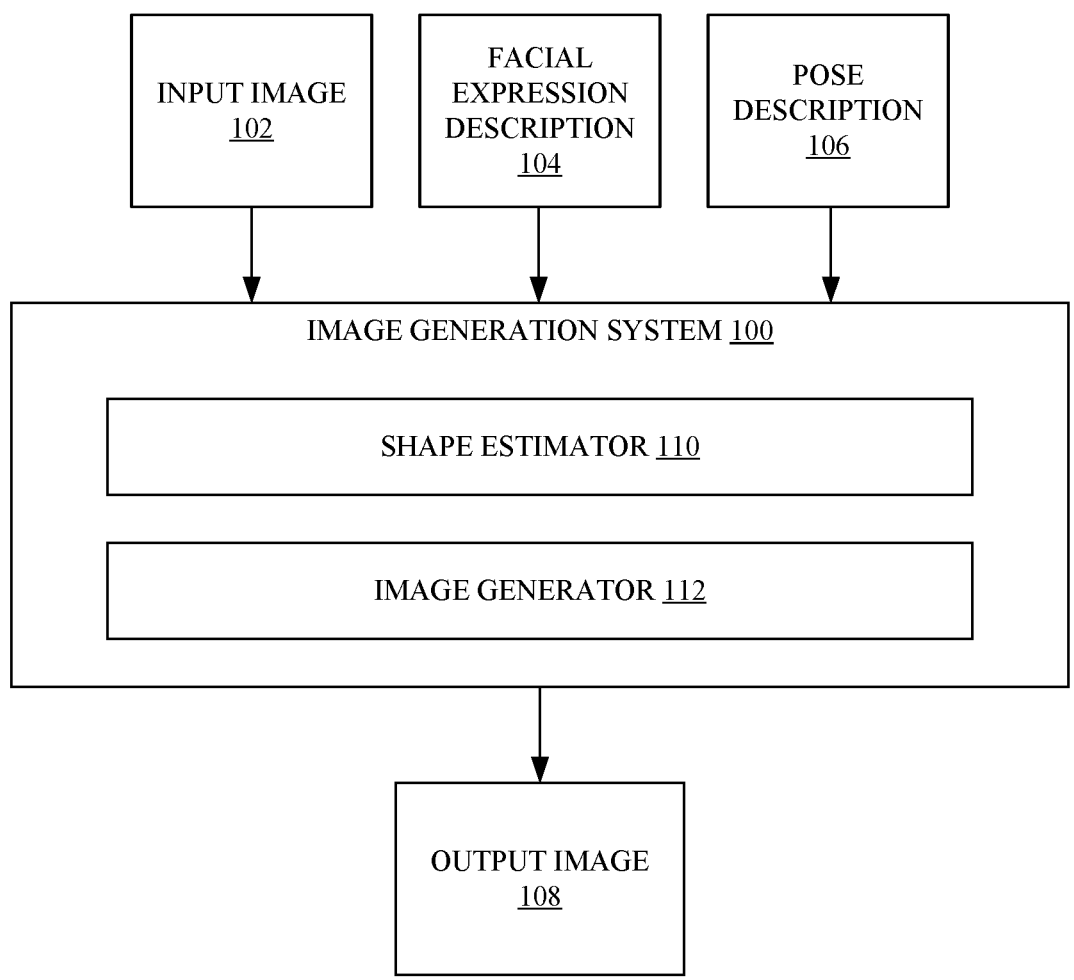
FIG. 1 is a block diagram that shows an image generation system that includes a shape estimator and an image generator.

In the systems and methods that are described herein, synthetic images of human faces are generated based on a reference image. The synthetic images can incorporate changes in facial expression and pose. At inference time, a single reference image can generate an image that looks like the person (i.e., the subject) of the reference image, but shows the face of the subject according to an expression and/or pose that the system or method has not previously seen. Thus, the generated image is a simulated image that appears to depict the subject of the reference image, but it is not actually a real image. As used herein a real image refers to a photographic image of a person that represents the person as they appeared at the time that the image was captured.

As will be explained, the systems and methods described herein first modify a shape description for the subject's face according to a change in facial expression and a change in pose. This results in a target shape description (e.g., parameters for a statistical model of face shape) that can be used to render an image of a target face shape. The target face shape incorporates a changed expression and/or pose relative to the reference image. The target face shape is rendered to generate a rendered target face shape image. The rendered target face shape image does not appear to depict the subject of the reference image. Instead, the rendered target face shape is generic, indistinct, and lacking texture, but sufficiently depicts major facial features (e.g., eyes and mouth) to convey position, shape, and expression for these features.

The rendered target face shape image and the reference image are provided to an image generator as inputs. The rendered version of the target face shape serves as a map that indicates the locations of facial features, and the reference image is used as a texture source to apply the appearance of the subject from the reference image to the rendered version of the target shape.

The image generator is a trained machine learning model (e.g., neural network) that is configured to generate an image that looks like a realistic image of a human face, incorporates a face shape (e.g., including facial expression and pose) that is consistent with the face shape from the rendered version of the target face shape, and is consistent with the identity of the subject of the reference image (e.g., the person depicted in the generated image appears to be the same person as the subject of the reference image). The image generator is trained to constrain generation of the output image based on the input image such that the output image appears to depict the subject of the input image. The image generator may be part of a generative adversarial network that is trained by concurrently training the generator to generate images and concurrently training a discriminator to determine whether images are real or not real, correspond to the face shape from the rendered version of the target face shape, and correspond to the identity of the subject from the reference image.

FIG. 1 is a block diagram that shows an image generation system 100. As inputs, the image generation system 100 receives an input image 102 (which may also be called a reference image), a facial expression description 104, and a pose description 106. The image generation system 100 generates an output image 108. The image generation system 100 is configured to generate the output image such that it appears to depict the same person who is depicted in the input image 102, but with modifications made relative to the input image 102 in accordance with the facial expression description 104 and pose description 106.

The input image 102 may be a still image that shows a person, and in particular, shows a face of the person. The person who is depicted in the input image 102 may be referred to herein as the subject of the input image 102. As an example, the input image 102 may be a headshot image that shows the person's face. The input image 102 may be a digital image comprised of pixels arranged in a grid. The input image 102 may be encoded in any suitable format and color space that allow interpretation of the input image 102 by the image generation system 100. In some implementations, one or more still image frames are used as the input image 102. In some implementations, one or more video frames are used as the input image 102.

The facial expression description 104 is an input to the image generation system 100 that describes a target facial expression to be shown in the output image 108. The facial expression description 104 is an encoded (e.g., using numerical values) representation of a facial expression. The facial expression description 104 may include a value or combination of values that represent commonly understood facial expressions that correspond to emotional states such as happiness, sadness, surprise, fear, anger, disgust, and contempt.

Any suitable technique may be used to implement the facial expression description 104. In the description herein, the well-known Facial Action Coding System is used to implement the facial expression description 104. The Facial Action Coding System describes human facial movements in a manner that corresponds to their appearance in terms of activation of action units. Action units are muscles or groups of muscles whose activation corresponds to particular facial movements. In the Facial Action Coding System, a facial expression may be encoded in terms of the action units that are involved, and the magnitude of activation for each of these action units.

In the implementations that are described herein, the facial expression description 104 is a relative value that describes the target facial expression in terms of a difference between a source facial expression from the input image and the target facial expression. As an example, the facial expression may include a relative value that indicates a difference value by which a smiling-type facial expression is to be increased or decreased in the output image 108 relative to the input image 102. In other implementations, the facial expression description 104 may be an absolute value that describes a magnitude (e.g., an intensity value between a minimum value and a maximum value) of a smiling-type facial expression to be depicted in the output image 108. In some implementations, an absolute value may be provided as an input by a user or by another system, and the absolute value may be converted to a relative value for use in processing operations by the image generation system 100.

The pose description 106 is a description of the orientation of the face to be depicted in the output image 108. The pose description 106 includes values that can be used to determine the orientation that is to be shown. In the implementations that are described herein, the pose description 106 includes relative values that describe a difference in rotation (pitch, roll, and/or yaw) of the face depicted in the output image 108 relative to the face depicted in the input image 102. The pose description 106 could instead be implemented using absolute values, such as absolute values for rotation measurements. In some implementations, absolute values may be accepted from a user or from another system for the pose description 106, and then converted to relative values by comparison with the pose shown in the input image 102 so that relative values may be provided to the image generation system 100 as inputs for processing.

The output image 108 may be a still image that shows a synthetic image of a person who appears to be the subject of the input image 102. The output image 108 is generated based on the input image 102 and such that the subject of the input image is depicted in accordance with the facial expression description 104 and the pose description 106. As an example, the output image 108 may be a headshot image that shows a simulated representation of the person's face. The output image 108 may be a digital image comprised of pixels arranged in a grid. The output image 108 may be encoded in any suitable format and color space. In some implementations, multiple still images or video frames are generated as outputs by the image generation system 100.

The image generation system 100 is a machine learning-based system that is configured to generate the output image 108 using the input image 102, the facial expression description 104, and the pose description 106. As will be explained herein, the image generation system 100 may be implemented using one or more neural networks. A neural network is a connected graph of neurons, which are processing units that produce an output in response to an input, and in accordance with an activation function. As an example, neurons may be sensitive to the presence or absence of a particular feature at a particular location in an image, and activate or remain inactive in response to the presence or absence of the particular feature. The behavior of each of the neurons may be established through training, which defines connections between neurons according to a vector of parameters, which are referred to as weights. The weights are determined through repeated iterations of training, in which the network produces an output using training data, the training data is compared to a known correct result (referred to as a ground truth), and the difference between the output and the ground truth (loss) is used as a basis for modifying the network. After a large number of training iterations, the network may converge such that the outputs typically match the ground truth values. Once training is completed, the weights of the network may be maintained constant without further modifications.

In the illustrated implementation, the image generation system 100 includes a shape estimator 110 and an image generator 112. The shape estimator 110 uses the facial expression description 104 and the pose description 106 to determine a shape for the face that will be depicted in the output image 108. The shape that is output by the shape estimator 110 lacks features that match the appearance of the subject of the input image 102. These features are added to the shape by the image generator 112, which uses the input image 102 as a basis for texturing the shape to define the output image. Implementations of the shape estimator 110 and the image generator 112 will be described further herein.

Figure 2:
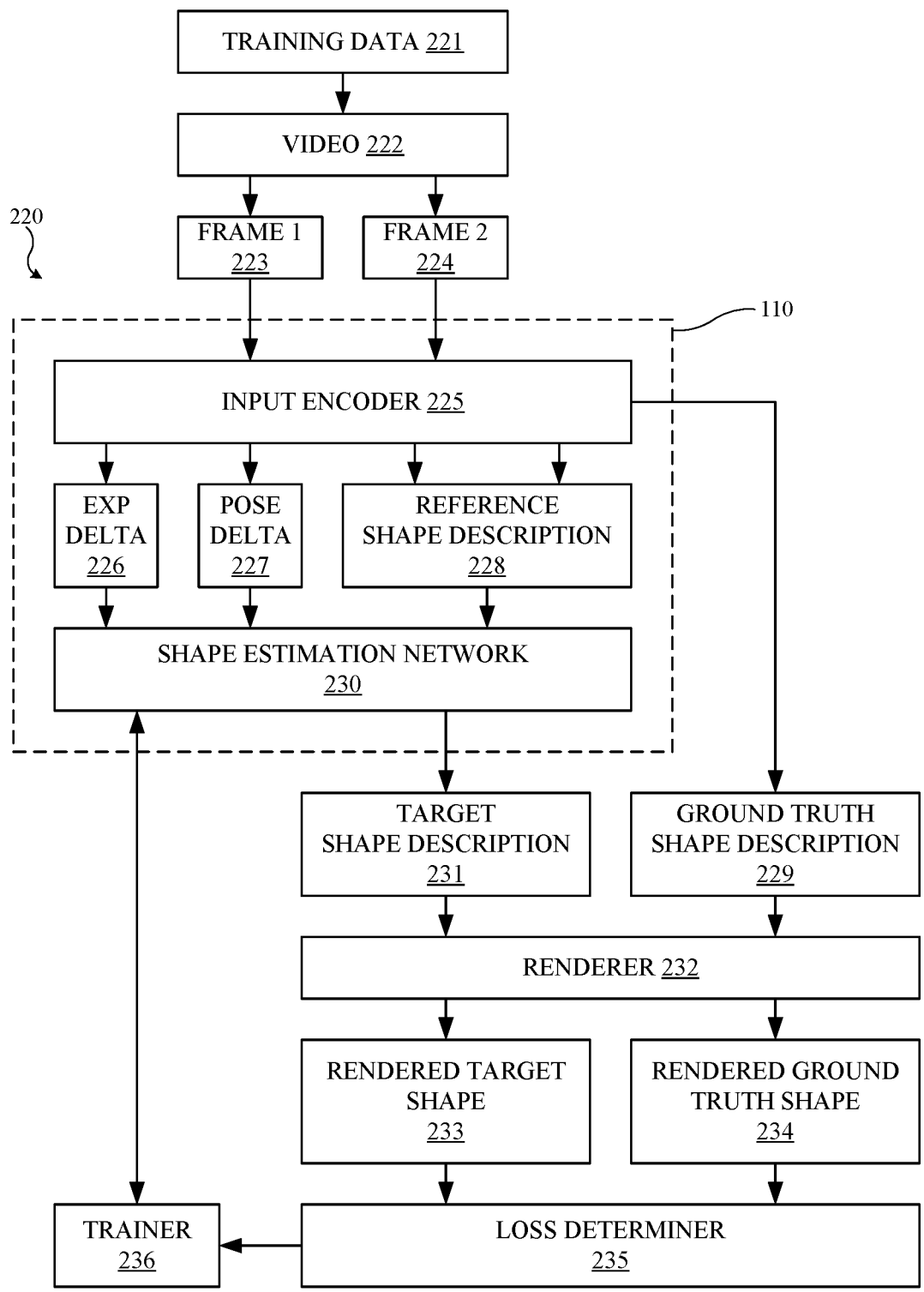
FIG. 2 is a block diagram that shows a shape estimator training system for the shape estimator.

FIG. 2 is a block diagram that shows a shape estimator training system 220 for the shape estimator 110.

The shape estimator training system 220 has access to training data 221. The training data 221 is a large group of content items and includes images that depict the face of a subject (where the subject is a person). As one example, the training data 221 may include videos from which images can be extracted. As another example, the training data 221 may include image pairs that each show the same person but with differing expressions and/or poses.

In the illustrated example, a video 222 that depicts the subject is obtained from the training data 221, e.g., by random selection of the video 222 from the training data 221. A first frame 223 and the second frame 224 are extracted from the video 222 by conventional techniques. The first frame 223 will serve as a reference frame that is used as starting point for shape estimation by the shape estimator 110. The second frame 224 will serve as a ground truth value to evaluate the result of shape estimation by the shape estimator 110. The first frame 223 and the second frame 224 depict the face of a single person but with differing expressions and/or poses. Image operations, such as cropping or scaling, may be performed as necessary to match the positions and scales of the subject's face in the first frame 223 and the second frame 224.

The first frame 223 and the second frame 224 are provided as inputs to an input encoder 225. The input encoder analyzes the expression and pose of the subject in each of the first frame 223 and the second frame 224.

An expression difference 226 (also referred to as an expression delta) is determined based on a difference between a first facial expression description for the first frame 223 and a second facial expression description for the second frame 224. As an example, the expression difference 226 may be encoded in terms of an increase or decrease for each of the action units included in the Facial Action Coding System, or can otherwise describe changes in a facial expression according to another facial expression encoding technique.

The input encoder 225 uses machine vision techniques to determine the first facial expression description for the first frame 223 and to determine the second facial expression description for the second frame 224. The first facial expression description corresponds to the facial expression of the subject in the first frame 223. The second facial expression description corresponds to the facial expression of the subject in the second frame 224.

Encoding of the first facial expression description for the first frame 223 and the second facial expression description for the second frame 224 may be implemented in the manner described with respect to the facial expression description 104, for example, using action units according to the Facial Action Coding System as is well known in the art.

A pose difference 227 (also referred to as a pose delta) is determined based on a difference between a first pose description for the first frame 223 and a second pose description for the second frame 224. As an example, the pose difference 227 may be encoded in terms of an increase or decrease for each of the yaw rotation value, the pitch rotation value, and the roll rotation value.

The input encoder 225 uses machine vision techniques to determine the first pose description for the first frame 223 and the second pose description for the second frame 224. The first pose description is generated by the input encoder 225 using the first frame 223 and represents the pose of the subject in the first frame 223. The second pose description is generated by the input encoder 225 using the second frame 224 and represents the pose of the subject in the second frame 224.

Encoding of the first pose description and the second pose description may be implemented in the manner described with respect to the pose description 106, for example, in terms of rotation values for each of a yaw rotation axis, a pitch rotation axis, and a roll rotation axis.

The input encoder 225 also determines a reference shape description 228 based on the first frame 223. In the implementations that are discussed herein, the reference shape description 228 is determined directly by the input encoder 225 using the first frame 223 as an input. In alternative implementations, the reference shape description 228 may be determined using the first frame 223 in combination with the first expression description from the first frame 223 and the first pose description from the first frame 223 or may be determined using the first expression description from the first frame 223 and the first pose description from the first frame 223 instead of using the first frame 223 directly.

The reference shape description 228 is a numerical model that describes the shape of the subject's face in the first frame 223. The reference shape description 228 is determined using a trained face shape model that is implemented using machine learning techniques. The face shape model may be included in the input encoder or may be usable by the input encoder. The parameters output by the face shape model describe shape of the face that was input into the model and can be used by the model to output a face image having the same shape, where the image output by the face shape model is not the face of the person from the first frame 223, but instead is a deviation from a mean face, which was determined from the face shape model during training based on all of the faces processed by the model from a training data set.

As an example, the reference shape description 228 can use principal component analysis to describe shape variations according to active appearance model or active shape model techniques, in which a statistical model of object shape, such as the face shape model described above, can be used to generate a new image based on parameters that are included in the reference shape description. Accordingly, the reference shape description 228 may be a group (e.g., a vector) of principal component analysis coefficients. The principal analysis coefficients included in the reference shape description 228 are the main coefficients of variation along the axes for the shape of the face from a mean of the faces used to train the active appear model or active shape model.

To generate the reference shape description 228, the input encoder 225 may incorporate a trained machine learning model (e.g., a trained neural network) that is configured according to active appearance model or active shape model techniques. As will be explained further herein, the reference shape description 228 is a set of parameters that can be used by the trained machine learning model to render a new image of a face. However, the reference shape description 228 does not encode any information as to the identity of the subject of the first frame 223, and instead encodes only shape information (e.g., including facial expression and pose). Accordingly, any image rendered directly from the reference shape description 228 without use of the first frame 223 (or other images of the subject) will be a synthetic face image that does not correspond in identity to the subject of the first frame 223.

The input encoder 225 also determines a ground truth shape description 229 based on the second frame 224. In the implementations that are discussed herein, the ground truth shape description 229 is determined directly by the input encoder 225 using the second frame 224 as an input. In alternative implementations, the ground truth shape description 229 may be determined using the second frame 224 in combination with the second expression description from the second frame 224 and the second pose description from the second frame 224 or may be determined using the second expression description from the second frame 224 and the second pose description from the second frame 224 instead of using the second frame 224 directly.

The ground truth shape description 229 is a numerical model output by a trained machine learning system to describe the shape of the subject's face in the second frame 224. As an example, the ground truth shape description 229 can use principal component analysis to describe shape variations according to active appearance model or active shape model techniques, in which a statistical model of object shape, such as the ground truth shape description 229, can be used to generate a new image. Accordingly, the ground truth shape description 229 may be a group (e.g., a vector) of principal component analysis coefficients. The principal analysis coefficients included in the ground truth shape description 229 are the main coefficients of variation along an axis for the shape of a mean of the faces used to train the active appearance model or active shape model.

To generate the ground truth shape description 229, the input encoder 225 may incorporate a trained machine learning model (e.g., a trained neural network) that is configured according to active appearance model or active shape model techniques. As will be explained further herein, the ground truth shape description 229 can be used to render a new image of a face. However, the ground truth shape description 229 does not encode any information as to the identity of the subject of the second frame 224, and instead encodes only shape information (e.g., including facial expression and pose). Accordingly, any image rendered directly from the ground truth shape description 229 without use of the second frame 224 (or other images of the subject) will be a synthetic face image that does not correspond in identity to the subject of the second frame 224.

The shape estimation model 230 is a neural network or other machine learning model that is trained by the shape estimator training system 220 to estimate a modified shape for the face of the subject from the first frame 223. As inputs, the shape estimation model 230 receives the expression difference 226, the pose difference 227, and the reference shape description 228. As an output, the shape estimation module generates a target shape description 231.

The shape estimation model 230 estimates the shape of the face of the subject from the first frame 223 as modified by the expression difference 226 and the pose difference 227 to reflect a change in pose of the subjects face in the second frame 224 as compared to the first frame 223. Effectively, the shape estimation model 230 is performing a transformation within shape space from a reference shape, which is in this example is given by the reference shape description 228, to a target shape, which in this example is given by the target shape description 231.

The target shape description 231 is a numerical model that the estimated shape of the subject's face based on the shape of the subject's face in the first frame 223 and as modified based on the expression difference 226 and the pose difference 227. As an example, the target shape description 231 can use principal component analysis to describe shape variations according to active appearance model or active shape model techniques, in which a statistical model of object shape, such as the target shape description 231, can be used to generate a new image. Accordingly, the target shape description 231 may be a group (e.g., a vector) of principal component analysis coefficients. The principal analysis coefficients included in the target shape description 231 are the main coefficients of variation along the axes for the shape of the face estimated by the shape estimation model 230.

The shape estimation model 230 is trained in the context of the shape estimator training system 220 by comparing the output of the shape estimation model 230 with a ground truth value representing the intended output. The output of the shape estimation model 230, which is the target shape description 231, is compared with the ground truth shape description 229. As per conventional machine learning techniques, the difference between the output and the ground truth is the loss that is used to modify the shape estimation network.

In the illustrated example, an image based comparison is used to compare the output of the shape estimation model with the ground truth. The target shape description 231 and the ground truth shape description 229 are provided to the renderer 232 as inputs. The renderer 232 is a machine learning-based model implemented according to active appearance model or active shape model techniques that is operable to output images based on the numerical shape descriptions that are included in the target shape description 231 and the ground truth shape description 229. As previously described, the images generated based on the target shape description 231 and the ground truth shape description 229 do not represent the subject of the first frame 223 and the second frame 224, but instead are synthetic face images that are not representative of a real person and instead represent shape, expression, and pose. The output of the renderer includes a rendered target shape 233 that corresponds to the target shape description 231 and a rendered ground truth shape 234 that corresponds to the ground truth shape description 229. The rendered target shape 233 and the rendered ground truth shape 234 may be raster images in any suitable format.

The rendered target shape 233 and the rendered ground truth shape 234 are provided to a loss determiner 235 as inputs. The loss determiner 235 is configured to output information (e.g., a score) that describes a difference between the rendered target shape 233 and the rendered ground truth shape 234. As an example, the loss determiner 235 may use a least absolute deviations (L1) loss function to determine loss for the rendered target shape 233 relative to the rendered ground truth shape 234. The loss value determined using the least absolute deviations loss function is a sum of the absolute values of differences between the ground truth values (e.g., pixel values in the rendered ground truth shape 234) and the predicted values (e.g., pixel values in the rendered target shape 233).

The loss values that are determined by the loss determiner 235 are passed to a trainer 236 that is configured to modify the shape estimation model 230. The trainer 236 may be implemented using well known neural network training techniques, such as gradient descent.

Figure 3:
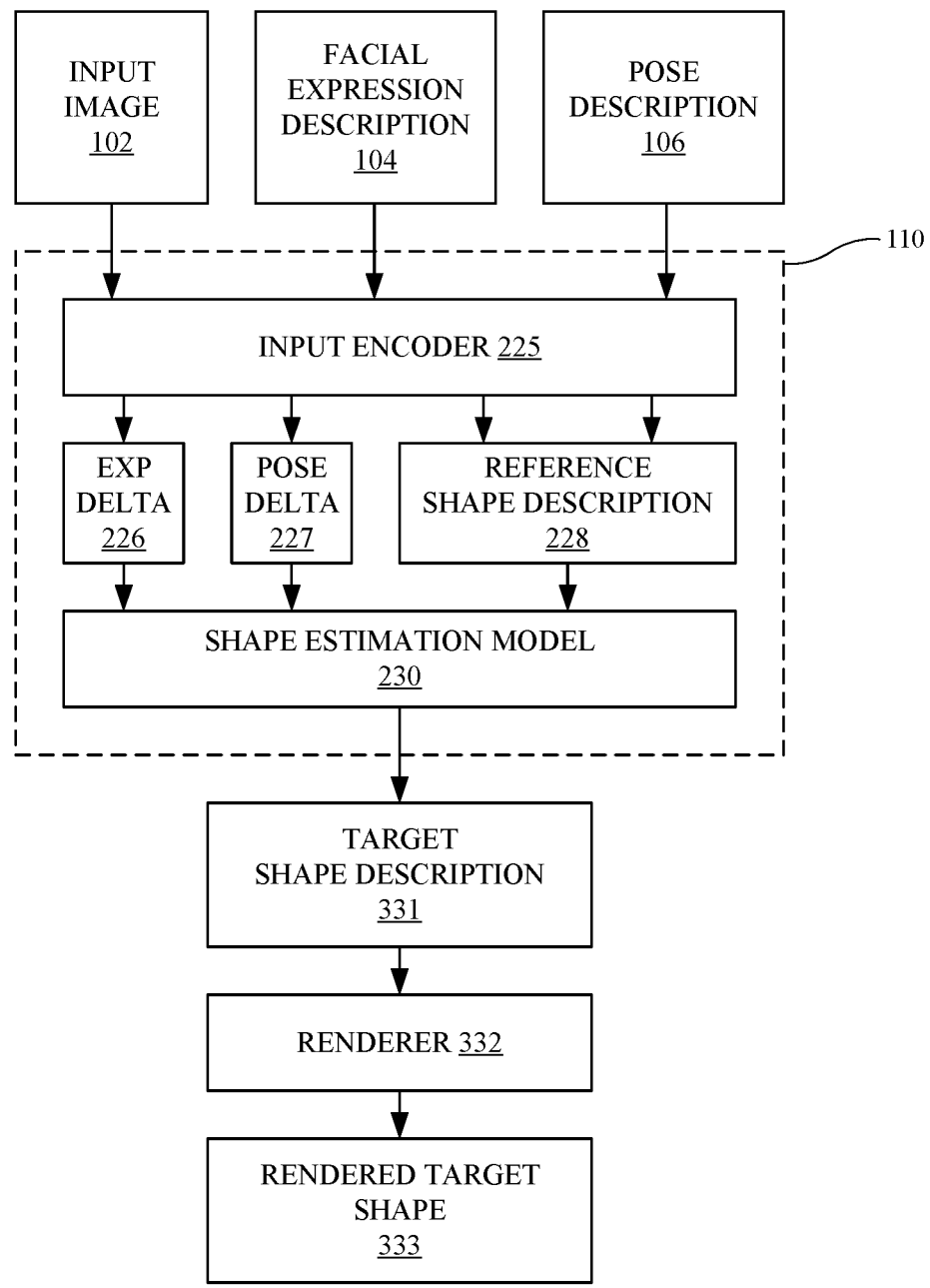
FIG. 3 is a block diagram that shows the shape estimator.

FIG. 3 is a block diagram that shows the shape estimator 110 subsequent to training and during use in the context of the image generation system 100. The shape estimator 110 receives the input image 102, the facial expression description 104, and the pose description 106 as inputs.

As described with respect to the shape estimator training system 220 of FIG. 2, the shape estimator 110 may include the input encoder 225, which processes the input image 102, the facial expression description 104, and the pose description 106. The input image 102 is processed to determine the reference shape description 228. The facial expression description 104 and the pose description 106 may be converted into the expression difference 226 and the pose difference 227 such that they are parameterized correctly for processing by the shape estimation model 230. This may include converting the facial expression description 104 and the pose description 106 for absolute values to relative (difference) values relative to the input image 102 if the facial expression description 104 and the pose description 106 are encoded as absolute values.

The shape estimation model 230 processes the expression difference 226, the pose difference 227, and the reference shape description 228 to determine the target shape description 331, which is equivalent to the target shape description 231, as previously described. A renderer 332 is implemented in the manner described with respect to the renderer 232, and generates a rendered target shape 333 based on the target shape description 331. The rendered target shape 333 is equivalent to the rendered target shape 233 of the shape estimator training system 220. The rendered target shape 333 may be provided to the image generator 112 as an input, as will be described further herein.

Figure 4:
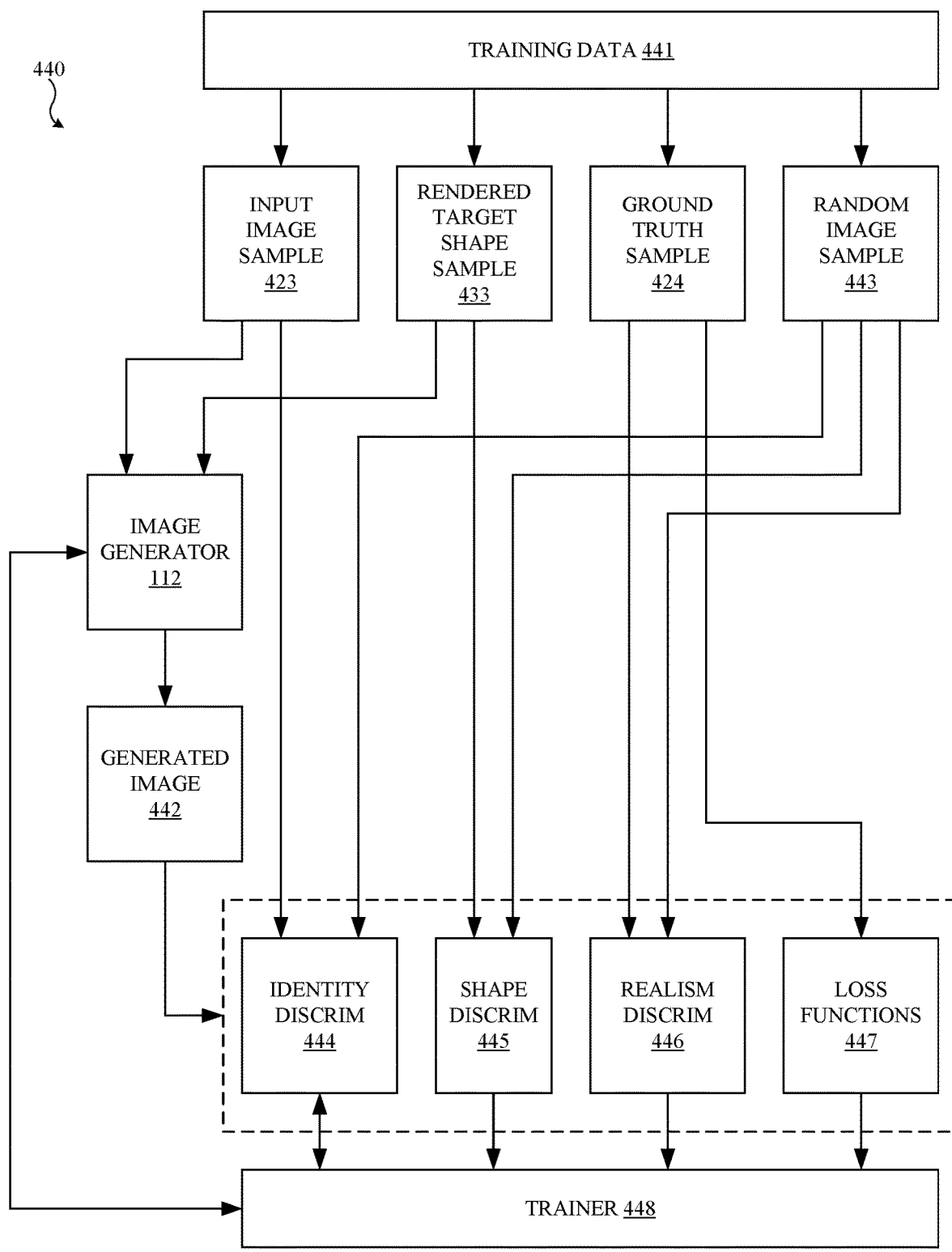
FIG. 4 is a block diagram that shows an image generator training system for the image generator.

FIG. 4 is a block diagram that shows an image generator training system 440 for the image generator 112. The image generator training system 440 is configured to train the image generator 112 to output a generated image 441 according to constraints that are learned by the image generator 112 through a large number of iterations of a training procedure. The image generator training system 440 is configured in the form of a generative adversarial network (GAN) in which a generator generates synthetic images, a discriminator attempts to determine whether the images are real or synthetic, and the result of the determination is used to further train both the generator and the discriminator.

The image generator training system 440 has access to training data 442. The training data 442 is a large group of content items and includes correlated sets of items. Each of these correlated sets includes an input image sample 423, a rendered target shape sample 433, and a ground truth sample 424. The training data 442 may also include random images from which a random image sample 443 can be taken. The input image sample 423 is a raster image showing the face of a subject and is consistent with the first frame 223 of the shape estimator training system 220. The ground truth sample 424 is a raster image showing the face of the subject and is consistent with the second frame 224 of the shape estimator training system 220. The rendered target shape sample 433 is consistent with the description of the rendered target shape 233 of the shape estimator training system 220, and corresponds to the shape that would be produced using the input image sample 423 and the ground truth sample 424 as training inputs. The random image sample 443 is not part of a correlated set of items and is used in training to provide negative training examples.

The image generator 112 receives the input image sample 423 and the rendered target shape sample 433 as inputs. The image generator 112 is a machine learning model, such as a neural network, that is trained during operation of the image generator training system 440, as will be described further herein. The function of the image generator 112 is to generate a generated image 441, which is a newly generated synthetic image that corresponds to the shape (e.g., including expression and pose) of the rendered target shape sample 433 and has the appearance of the input image sample 423.

In the image generation process that is performed by the image generator 112, the rendered target shape sample 433 serves as a label map that identifies the locations of the image where particular facial features should appear. As previously described, the rendered target shape sample 433 does not correspond to the appearance of the subject of the input image sample 423. Instead, the training procedure performed in the context of the image generator training system 440 teaches the image generator 112 to preserve the identity of the subject from the input image sample 423. Generally speaking, the process performed by the image generator using the rendered target shape sample 433 as a label map and textures the rendered target shape sample 433 using the input image sample 423, which applies the appearance of the subject from the input image sample 423 to the rendered target shape sample 433, with the source and destination locations for texturing being selected in dependence on the rendered target shape sample 433.

As will be explained further herein, the discriminator that is used in the image generator training system 440 is conditioned in part on the identity of subject from the input image sample 423 and is conditioned in part on the rendered target shape sample 433.

The generated image 441 is provided as an input to discriminators that, along with the image generator 112, define the generative adversarial network architecture of the image generator training system 440. The discriminators include an identity-based discriminator 444, a shape-based discriminator 445, and a realism-based discriminator 446.

The identity-based discriminator 444 is a machine learning model that is trained during the training procedure that is performed by the image generator training system 440. The identity-based discriminator 444 receives the generated image 441 and the input image sample 423 as inputs. The identity-based discriminator 444 may also receive the random image sample 443 as an input.

The function of the identity-based discriminator 444 is to determine whether or not the person depicted in the generated image 441 is the same person (the subject) who is depicted in the input image sample 423. Thus, the identity-based discriminator is trained to determine whether or not the identity of persons in two images is the same. When the generated image 441 and the input image sample 423 are evaluated and found to depict the same person, this is considered a correct result. During some training iterations, identity-based discriminator 444 is provided with the generated image 441 and the random image sample 443 as inputs. When the generated image 441 and the random image sample 443 are evaluated and found to not depict the same person, this is considered a correct result.

The shape-based discriminator 445 is a machine learning model that is trained during the training procedure that is performed by the image generator training system 440. The shape-based discriminator 445 receives the generated image 441 and the rendered target shape sample 433 as inputs. The shape-based discriminator 445 may also receive the random image sample 443 as an input.

The function of the shape-based discriminator 445 is to determine whether or not the face shape (e.g., including facial expression and pose) that is depicted in the generated image 441 corresponds to the shape that is represented in the rendered target shape sample 433. When the generated image 441 and the input image sample 423 are evaluated and found to depict the same shape, this is considered a correct result. During some training iterations, identity-based discriminator 444 is provided with the generated image 441 and the random image sample 443 as inputs. When the generated image 441 and the random image sample 443 are evaluated and found to not depict the same person, this is considered a correct result.

The realism-based discriminator 446 is a machine learning model that is trained during the training procedure that is performed by the image generator training system 440. The realism-based discriminator 446 receives the generated image 441 and the ground truth sample 424 as inputs. The realism-based discriminator 446 may also receive the random image sample 443 as an input.

The function of the realism-based discriminator 446 is to determine whether or not the generated image 441 is a real image or a synthetic image. When the generated image 441 is determined to be a real image, this is determined to be a correct result for the image generator 112 and is determined to be an incorrect result for the realism-based discriminator 446. During some training iterations, the identity-based discriminator 444 is provided with the generated image 441 and the random image sample 443 as inputs. When the random image sample 443 is determined to be a real image, this is determined to be a correct result for the realism-based discriminator 446 and is neither correct or incorrect for the purposes of training the image generator 112.

In the description above, the realism based discriminator may be implemented as a GAN discriminator that determines realism on a per image based and outputs a signal indicative a correct or incorrect result on a per-image basis. In other implementations, the realism-based discriminator may be implemented using a technique that considers realism for multiple portions of the image. One example is a PatchGAN discriminator that divides the image into overlapping patches and outputs realism predictions for each of the patches. This allows correct and incorrect result determinations to be used for training the image generator 112 on a per-patch basis.

The image generator training system 440 may also evaluate the generated image 441 using one or more loss functions 447 in addition to the identity-based discriminator 444, the shape-based discriminator 445, and the realism-based discriminator 446. The loss functions 447 compare the generated image 441 to the ground truth sample 424. One example of a loss function that may be used to compare the generated image 441 to the ground truth sample 424 is a least absolute deviations (L1) loss function, as previously described. Another example of a loss function that may be used to compare the generated image 441 to the ground truth sample 424 is a perceptual loss function. As an example, a perceptual loss function can be implemented using the VGG19 network, which is able to output a loss value that represents perceptual loss as is known in the art.

The image generator training system 440 includes a trainer 448 that is implemented according to well-known machine learning techniques. The trainer 448 receives outputs (e.g., loss values) from the identity-based discriminator 444, the shape-based discriminator 445, the realism-based discriminator 446, and the loss functions 447. These outputs are used as a basis for modifying the image generator 112, the identity-based discriminator 444, the shape-based discriminator 445, and the realism-based discriminator 446.

Figure 5:
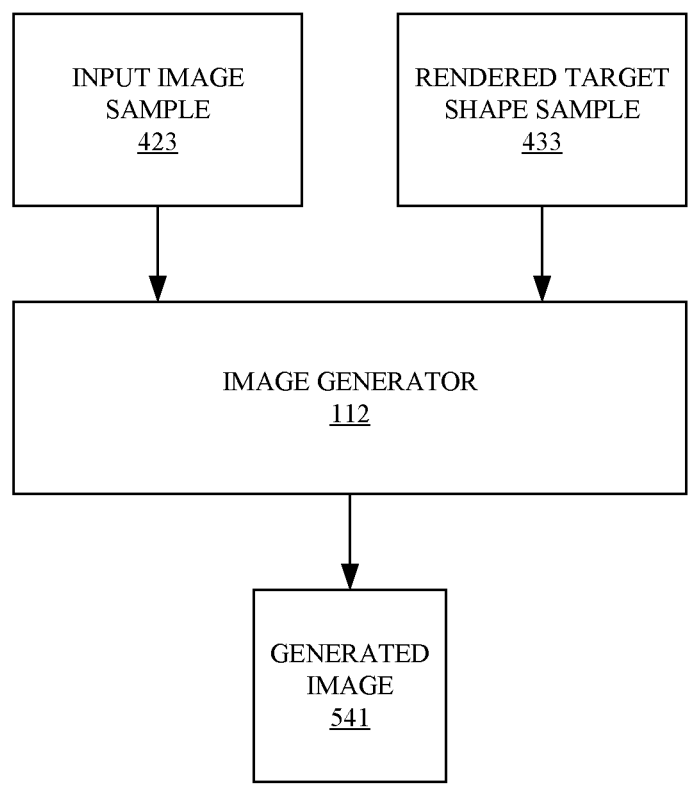
FIG. 5 is a block diagram that shows the image generator.

FIG. 5 is a block diagram that shows the image generator 112 subsequent to training and during use in the context of the image generation system 100. The image generator receives the input image 102 and the rendered target shape 333 from the shape estimator 11 as inputs. As described with respect to the image generator training system 440 of FIG. 4, the image generator uses the input image 102 and the rendered target shape 333 as a basis for generating a generated image 541, which is consistent with the description of the generated image 441 that is generated during training in the context of the image generator training system 440.

Consistent with the previous description of the image generator 112 and the generated image 441, the generated image 541 that is generated during use of the image generator 112 subsequent to training is intended to looks like a realistic image of a human face, incorporates a face shape (e.g., including facial expression and pose) that is consistent with the face shape from the rendered target shape 333, and is consistent with the identity of the subject of the input image 102. Thus, the person that is depicted in the generated image 541 appears to be the same person as the subject of the input image 102.

Figure 6:
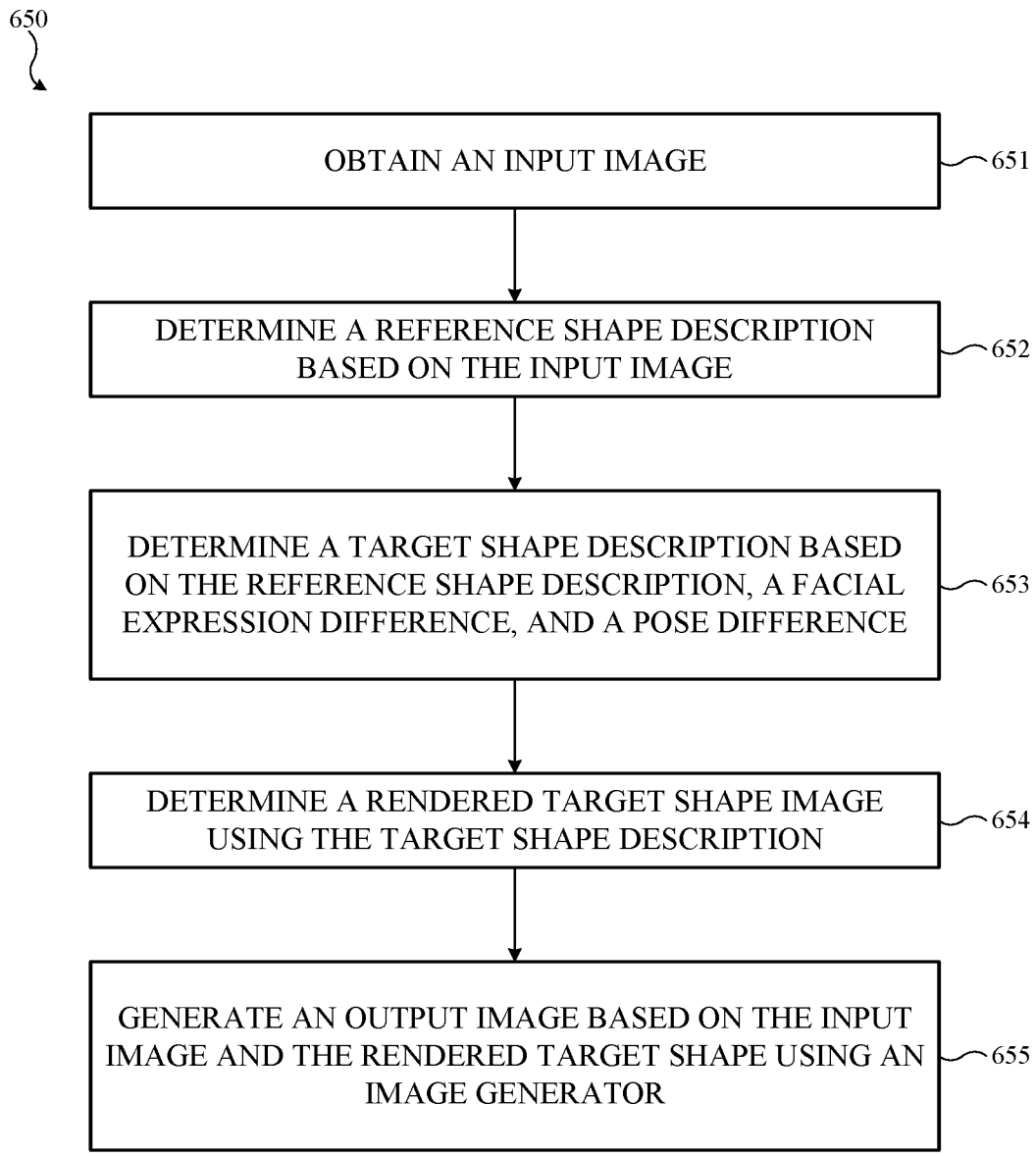
FIG. 6 is a flowchart that shows a process for face image generation with pose and expression control.

FIG. 6 is a flowchart that shows a process 650 for face image generation with pose and expression control. The process 650 may be implemented in accordance with the description of the image generation system 100. The description of the image generation system 100 and its various inputs, outputs, and components is incorporated by reference in the description of the process 650.

The process 650 may be implemented using a computing device. As one example, a computing device may include one or more processors, one or more memory devices, and computer-interpretable instructions that are stored in the one or more memory device and accessible to the one or more processors, wherein the instructions, when executed by the one or more processors, cause the one or more processors to perform the operations of the process 650. In some implementations, the process 650 is implemented in the form of a non-transitory computer-readable storage medium that includes computer-interpretable program instructions that cause operation of the process 650 by one or more processors when executed.

Operation 651 includes obtaining an input image that depicts a face of a subject. The face of the subject has an initial facial expression and an initial pose. The input image in operation 651 may be the input image 102 as previously described. The initial facial expression and the initial pose are the facial expression and pose that are observable in the input image.

Operation 652 includes determining a reference shape description based on the input image. The reference shape description may be a statistical representation of face shape determined using a trained machine learning model as described with respect to the reference shape description 228.

Operation 653 includes determining a target shape description based on the reference shape description, a facial expression difference (e.g., the expression difference 226), and a pose difference (e.g., the pose difference 227). The target shape description may be a statistical representation of face shape as described with respect to the target shape description 331. The facial expression difference may be encoded using action units from the Facial Action Coding System as described with respect to the expression difference 226. The pose difference may be encoded using rotation values as described with respect to the pose difference 227. Determination of the target shape in operation 653 may be performed in the manner described with respect to the shape estimation model 230.

Operation 654 includes generating a rendered target shape image using the target shape description. The rendered target shape image represents face shape, expression, and pose, but the rendered target shape image does not appear to depict the subject of the input image. The rendered target shape image in operation 654 may be consistent with the description of the rendered target shape 333. Generating the rendered target shape in operation 654 may be performed in the manner described with respect to the renderer 332.

Operation 655 includes generating an output image based on the input image (e.g., the input image 102) and the rendered target shape image (e.g., the rendered target shape 333) using an image generator, such as the image generator 112. The output image in operation 655 may be consistent with the description of the generated image 541 and is a simulated image of the subject of the input image that has a final expression that is based on the initial facial expression and the facial expression difference, and a final pose that is based on the initial pose and the pose difference. The image generator in operation 655 may be a machine learning model that is trained to constrain generation of the output image based on the input image such that the output image appears to depict the subject of the input image. The image generator may be a trained generator from a generative adversarial network that is trained using a discriminator that determines whether a person depicted in the output image is the subject of the input image as described with respect to the image generator training system 440.

Figure 7:
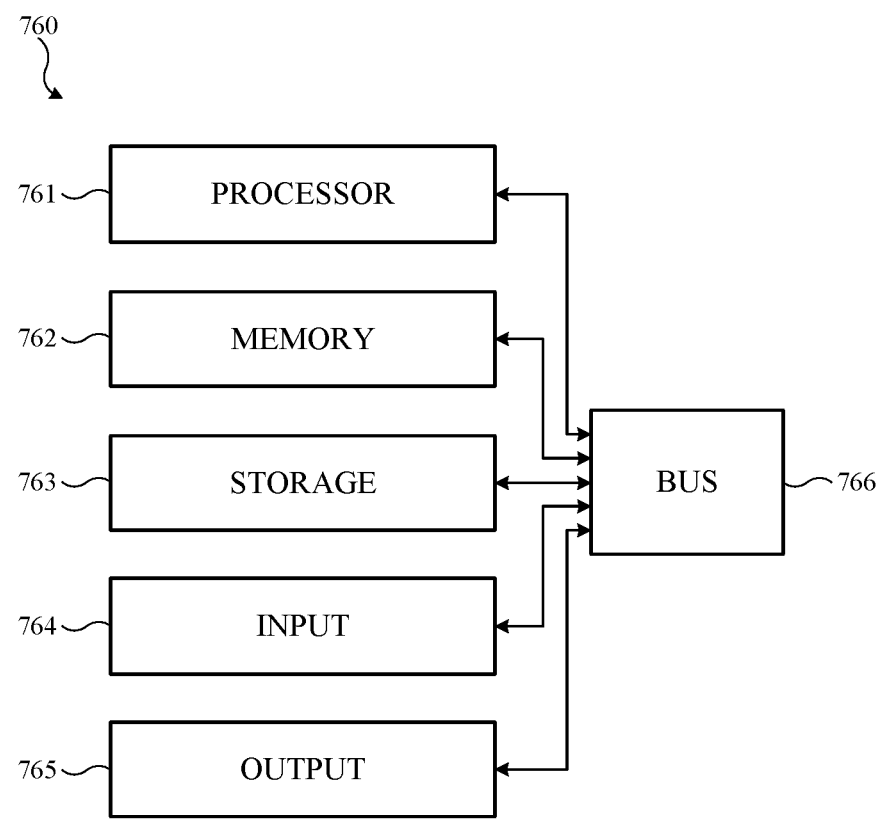
FIG. 7 is an illustration that shows an example of a hardware configuration for a computing device.

FIG. 7 is an illustration that shows an example of a hardware configuration for a computing device that can be used to implement the systems described herein, including the image generation system 100. The computing device 760 may include a processor 761, a memory 762, a storage device 763, one or more input devices 764, and one or more output devices 765. The computing device 760 may include a bus 766 or a similar device to interconnect the components for communication. The processor 761 is operable to execute computer program instructions and perform operations described by the computer program instructions. As an example, the processor 761 may be or include one or more conventional processing devices of any type, such as a central processing unit, a field-programmable gate array, or an application specific. The memory 762 may be a volatile, high-speed, short-term information storage device such as a random-access memory module. The storage device 763 may be a non-volatile information storage device such as a hard drive or a solid-state drive. The input devices 764 may include any type of human-machine interface such as buttons, switches, a keyboard, a mouse, a touchscreen input device, a gestural input device, or an audio input device. The output devices 765 may include any type of device operable to provide an indication to a user regarding an operating state, such as a display screen or an audio output.

The image generation system 100 may be used in various applications. As one example, the image generation system can be used as a teaching tool to help persons who have difficulty recognizing emotions, for example, through demonstrations and exercises in which the student is shown images in which the subject's facial expressions are modified to appear more intense (e.g., a heightened degree of happiness or sadness) relative to typical emotional responses. As another example, the image generation system 100 may be used in the context of still image or video editing, to revise the head pose or facial expression of a subject. As another example, the image generation system 100 may be used in the context of video generation or editing, to generate or add a video sequence that applies animation to a subject's head pose and/or facial expressions. Other applications are possible.

As described above, one aspect of the present technology is the gathering and use of data available from various sources generate synthetic images having different facial expressions or poses relative to images that are submitted by a user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to retouch photographs by changing facial expressions or by showing subjects with open eyes rather than with closed eyes. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide images. In yet another example, users can select to limit the length of time images are maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A non-transitory computer-readable storage medium including program instructions executable by one or more processors that, when executed, cause the one or more processors to perform operations, the operations comprising:
    obtaining an input image that depicts a face of a subject, wherein the face of subject has an initial facial expression and an initial pose;
    determining a reference shape description based on the input image;
    determining a target shape description based on the reference shape description, a facial expression difference, and a pose difference;
    generating a rendered target shape image using the target shape description; and
    generating an output image based on the input image and the rendered target shape image using an image generator, wherein the output image is a simulated image of the subject of the input image that has a final expression that is based on the initial facial expression and the facial expression difference, and a final pose that is based on the initial pose and the pose difference.

2. The non-transitory computer-readable storage medium of claim 1, wherein the image generator is a machine learning model that is trained to constrain generation of the output image based on the input image such the output image appears to depict the subject of the input image.

3. The non-transitory computer readable storage medium of claim 1, wherein the output image is generated by a trained generator from a generative adversarial network that is trained using a discriminator that determines whether a person depicted in the output image is the subject of the input image.

4. The non-transitory computer-readable storage medium of claim 1, wherein the rendered target shape image does not appear to depict the subject of the input image.

5. The non-transitory computer-readable storage medium of claim 1, wherein the facial expression difference is encoded using action units from the Facial Action Coding System.

6. The non-transitory computer-readable storage medium of claim 1, wherein the pose difference is encoded using rotation values.

7. The non-transitory computer-readable storage medium of claim 1, the operations further comprising:
    determining a reference shape description based on the input image; and
    determining a target shape description based on the reference shape description, the facial expression difference, and the pose difference, wherein generating the rendered target shape image based on the input image, the facial expression difference, and the pose difference comprises generating the rendered target shape image using the target shape description.

8. The non-transitory computer-readable storage medium of claim 7, wherein the reference shape description and the target shape description are statistical representations of face shape.

9. A system, comprising:
    a memory that includes program instructions; and
    a processor that is operable to execute the program instructions, wherein the program instructions, when executed by the processor, cause the processor to:
        obtain an input image that depicts a face of a subject, wherein the face of the subject has an initial facial expression and an initial pose,
        generate a rendered target shape image based on the input image, a facial expression difference, and a pose difference, and
        generate an output image based on the input image and the rendered target shape image, wherein the output image is a simulated image of the subject of the input image that has a final expression that is based on the initial facial expression and the facial expression difference, and a final pose that is based on the initial pose and the pose difference.

10. The system of claim 9, wherein the output image is generated by a machine learning model that is trained to constrain generation of the output image based on the input image such that the output image appears to depict the subject of the input image.

11. The system of claim 9, wherein the program instructions further cause the processor to:
    determine a reference shape description based on the input image; and
    determine a target shape description based on the reference shape description, the facial expression difference, and the pose difference, wherein the program instructions cause the processor to generate the rendered target shape image based on the input image, the facial expression difference, and the pose difference by generating the rendered target shape image using the target shape description.

12. The system of claim 9, wherein the rendered target shape image does not appear to depict the subject of the input image.

13. The system of claim 9, wherein the facial expression difference is encoded using action units from the Facial Action Coding System.

14. The system of claim 9, wherein the pose difference is encoded using rotation values.

15. The system of claim 11, wherein the refrence shape description and the target shape description are statistical representations of face shape.

16. The system of claim 9, wherein the output image is generated by a trained generator from a generative adversarial network that is trained using a discriminator that determines whether a person depicted in the output image is the subject of the input image.

17. A method, comprising:
    obtaining an input image that depicts a face of a subject, wherein the face of the subject has an initial facial expression and an initial pose;
    generating a rendered target shape image based on the input image, a facial expression difference, and a pose difference; and
    generating an output image based on the input image and the rendered target shape image, wherein the output image is a simulated image of the subject of the input image that has a final expression that is based on the initial facial expression and the facial expression difference, and a final pose that is based on the initial pose and the pose difference.

18. The method of claim 17, wherein the output image is generated by a machine learning model that is trained to constrain generation of the output image based on the input image such that the output image appears to depict the subject of the input image.

19. The method of claim 17, wherein the output image is generated by a trained generator from a generative adversarial network that is trained using a discriminator that determines whether a person depicted in the output image is the subject of the input image.

20. The method of claim 17, wherein the rendered target shape image does not appear to depict the subject of the input image.

21. The method of claim 17, wherein the facial expression difference is encoded using action units from the Facial Action Coding System.

22. The method of claim 17, wherein the pose difference is encoded using rotation values.

23. The method of claim 17, further comprising:
    determining a reference shape description based on the input image; and
    determining a target shape description based on the reference shape description, the facial expression difference, and the pose difference, wherein generating the rendered target shape image based on the input image, the facial expression difference, and the pose difference comprises generating the rendered target shape image using the target shape description.

24. The method of claim 23, wherein the reference shape description and the target shape description are statistical representations of face shape.

\* \* \* \* \*

UNITED STATES PATENT AND TRADEMARK OFFICE
CERTIFICATE OF CORRECTION

| | |
|---|---|
| PATENT NO. | : 11,475,608 B2 |
| APPLICATION NO. | : 16/983561 |
| DATED | : October 18, 2022 |
| INVENTOR(S) | : Barry-John Theobald, Nataniel Ruiz Gutierrez and Nicholas E. Apostoloff |

It is certified that error appears in the above-identified patent and that said Letters Patent is hereby corrected as shown below:

In the Claims

At Column 17, Claim number 15, Line number 6, --refrence-- should be "reference".

Signed and Sealed this
Twentieth Day of December, 2022

*Katherine Kelly Vidal*
Katherine Kelly Vidal
*Director of the United States Patent and Trademark Office*